United States Patent [19]

Benscheidt et al.

[11] 4,396,581
[45] Aug. 2, 1983

[54] APPARATUS FOR MAKING PHOSPHORUS PENTASULFIDE

[75] Inventors: Hans-Dieter Benscheidt, Hagen; Friedrich Neumann, Holzwickede-Hengsen; Günter Reichert, Bornheim-Merten; Hermann Niermann, Erftstadt, all of Fed. Rep. of Germany

[73] Assignee: Hoechst Aktiengesellschaft, Fed. Rep. of Germany

[21] Appl. No.: 330,228

[22] Filed: Dec. 14, 1981

[30] Foreign Application Priority Data

Dec. 17, 1980 [DE] Fed. Rep. of Germany ....... 3047505

[51] Int. Cl.³ .............................................. B01J 19/18
[52] U.S. Cl. .................................... 422/188; 137/579; 366/177; 422/198; 422/225; 422/236; 423/303
[58] Field of Search ............... 422/188, 224, 225, 236, 422/193, 198; 366/177; 423/303; 137/262, 263, 574, 579, 615, 625.44

[56] References Cited

U.S. PATENT DOCUMENTS

| | | | |
|---|---|---|---|
| 2,198,418 | 4/1940 | Snow | 137/579 |
| 2,569,128 | 9/1951 | Jones | 423/303 |
| 2,781,301 | 2/1957 | Payne | 422/188 X |
| 2,844,442 | 7/1958 | Lefforge | 423/303 |
| 3,183,062 | 5/1965 | Taylor | 423/303 |
| 3,342,552 | 9/1967 | Niermann et al. | 423/303 |
| 3,524,725 | 8/1970 | Cremer et al. | 423/303 |
| 3,987,816 | 10/1976 | Lange | 137/574 X |
| 4,097,583 | 6/1978 | Niermann et al. | 423/303 |

FOREIGN PATENT DOCUMENTS

| | | | |
|---|---|---|---|
| 2347062 | 3/1975 | Fed. Rep. of Germany | 423/303 |
| 55-29728 | 8/1980 | Japan | 422/188 |
| 1220014 | 1/1971 | United Kingdom | 423/303 |

Primary Examiner—Richard L. Chiesa
Attorney, Agent, or Firm—Connolly and Hutz

[57] ABSTRACT

The invention relates to an apparatus for making $P_2S_5$ comprised of a plurality of reactors connected by pipe structures to a collecting tank which is common to all of them. By means of partitions, the cooling tank is subdivided into a plurality of separate chambers. Outlet pipes open thereinto and terminate in collecting devices. The pipe structures running to the collecting tank are pivotably arranged above the various chambers and permit liquid $P_2S_5$ to be introduced thereinto at will.

7 Claims, 1 Drawing Figure

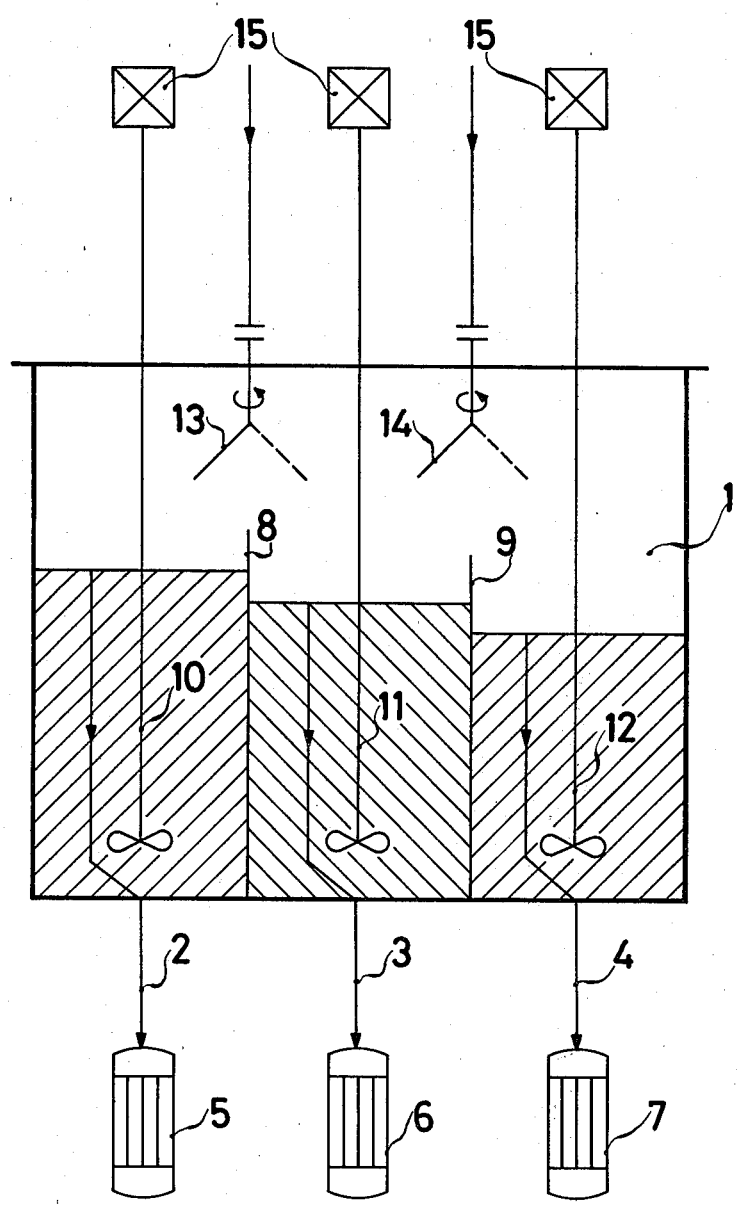

APPARATUS FOR MAKING PHOSPHORUS PENTASULFIDE

The present invention relates to an apparatus for making $P_2S_5$, comprised of a plurality of individual reactors and one liquid $P_2S_5$-collecting tank, which is common to all of the reactors and provided with a plurality of feed pipes running to the various reactors.

Phosphorus pentasulfide is customarily produced by reacting sulfur and yellow phosphorus in a reactor at temperatures within the range 300° to 500° C.

West German Pat. No. 1 767 322 describes an apparatus for making $P_2S_5$, comprised of a plurality of reactors, which are provided with phosphorus and sulfur feed pipes and connected, through overflow and bottom outlets, if any, to an agitator-provided collecting tank which is common to the reactors and provided with a conduit running to a cooling and grinding station. The overflow pipes and collecting tank are additionally provided with heating elements and means permitting the temperature to be controlled and regulated.

In the collecting vessel, the liquid phosphorus pentasulfide is subjected to thermal after-treatment to improve homogenization. Next, it is allowed to solidify and ground.

Various devices, e.g. cooling worms, cooling drums, rotating plates or cooling rollers, are normally used to initiate solidification depending on whether phosphorus pentasulfide of high or low reactivity is desired to be produced as the final product.

In the event of the $P_2S_5$ produced being deliverd to two or more cooling devices, problems are liable to be encountered upon switching over from one cooling device to the other.

Valves in combination with various pipes would enable such switching over from one device to another, but they are actually of limited use only at the high temperature of about 400° C. which results in sealing problems and corrosiveness. In addition to this, an extensive system of pipes and valves would be necessary for the alternate delivery of $P_2S_5$ from various reactors to the respective cooling device.

It is therefore an object of the present invention to provide a novel apparatus permitting liquid $P_2S_5$ which is continuously made in a plurality of reactors to be reliably delivered to a plurality of cooling devices, for solidification thereon or therein.

To achieve this, the invention now unexpectedly provides an apparatus, such as that shown diagrammatically in the accompanying drawing, comprised of a plurality of reactors, one liquid $P_2S_5$-collecting tank which is common to all of the reactors, the tank being provided with a plurality of feed pipes running to the various reactors and having a cooling device placed downstream thereof.

The invention provides more particularly for the collecting tank (1) to have additional cooling devices (5, 6, 7) arranged downstream thereof and connected thereto by means of separate outlet pipes (2, 3, 4); for the collecting tank to be subdivided by partitions (8, 9) into a plurality of separate chambers (10, 11, 12)—corresponding in number to the number of the outlet pipes (2, 3, 4) which open thereinto; and for feed pipes (13, 14) to be pivotably arranged above the chambers (10, 11, 12) so as to permit liquid $P_2S_5$ to be introduced selectively thereinto at will.

Preferred features of the present apparatus provide:
(a) for the outlets (2, 3, 4) in chambers (10, 11, 12) to be bottom outlets;
(b) for the outlets (2, 3, 4) in chambers (10, 11, 12) to be overflows terminating at a level lower than the upper end of the partitions (8, 9) and considerably above the bottom of chambers (10, 11, 12);
(c) for the chambers (10, 11, 12) to have agitators (15) installed therein;
(d) for the upper ends of the partitions to terminate at different levels, the individual partitions (8, 9) forming in each case an overflow between two adjacent chambers with different filling volumes;
(e) for different cooling devices to be installed in the apparatus; and
(f) for the cooling device (5, 6, 7) most unsusceptible to disturbances to be connected to the chamber (10, 11, 12) with the lowest filling volume.

The apparatus of this invention has the particular merit of permitting liquid $P_2S_5$ to be conveyed from a single collecting tank to various separate cooling devices and solidified therein to $P_2S_5$ of variable reactivity without the need to use extensive distribution system of pipes and valves which are incidentally liable to become clogged or leaky.

A further technically beneficial effect of the present apparatus resides in the fact that, in the event of a breakdown affecting one cooling device or other, it is possible for the flow of $P_2S_5$ continuously coming from the reactors to be directed to an unaffected cooling device.

It is therefore good practice for the chamber in the collecting tank with the lowest filling volume, to be connected to the cooling device most unsusceptible to disturbances, generally a cooling roller which has a broad load capacity.

EXAMPLE

Two reactors, in which purified phosphorus and sulfur were reacted at 380° C. so as to obtain about 750 kg/h $P_2S_5$, were provided with pivotable tubular inlets (13) and (14) permitting them to be connected to a liquid $P_2S_5$-collecting tank (1) which was electrically heated to about 380° C.

The collecting tank (1) was subdivided into three chambers (10, 11, 12) of which each was connected to a cooling device (5, 6, 7). Installed in each chamber was an agitator (15) which permitted the $P_2S_5$ to be homogenized. The $P_2S_5$ was allowed to remain in the respective chambers over a period of about 1 hour and delivered via overflow lines (2, 3, 4) to the respective cooling devices.

The three chambers (10, 11, 12) were provided with partitions (8, 9) differently high so that the $P_2S_5$ overflowing from one chamber to another ultimately arrived in the chamber provided with the cooling device of maximum capacity, i.e. with cooling roller (7) in the present Example.

We claim:
1. In an apparatus for making $P_2S_5$ comprised of a plurality of reactors and one liquid $P_2S_5$-collecting tank which is common to all of the reactors, the tank being provided with a plurality of feed pipes running from the various reactors and having a cooling device placed downstream thereof, the improvement wherein the collecting tank (1) has a plurality of cooling devices (5,6,7) arranged downstream thereof and connected thereto by means of separate outlet pipes (2,3,4), the collecting tank being subdivided by partitions (8,9) into a plurality of separate chambers (10,11,12) corresponding in number to the number of outlet pipes (2,3,4) which open thereinto, feed pipes (13,14) being pivotably arranged above the chambers (10,11,12) so as to permit liquid $P_2S_5$ to be introduced into a selected chamber at will.

2. The apparatus as claimed in claim 1, wherein the outlets (2, 3, 4) in chambers (10, 11, 12) are bottom outlets.

3. The apparatus as claimed in claim 1, wherein the outlets (2, 3, 4) in chambers (10, 11, 12) are overflows terminating at a level lower than the upper end of the partitions (8, 9) and considerably above the bottom of chambers (10, 11, 12).

4. The apparatus as claimed in claim 3, wherein the chambers (10, 11, 12) have agitators (15) installed therein.

5. The apparatus as claimed in claim 1, wherein the upper ends of the partitions terminate at different levels, the individual partitions (8, 9) forming in each case an overflow between two adjacent chambers (10, 11, 12) with different filling volumes.

6. The apparatus as claimed in claim 1, wherein different cooling devices are provided.

7. The apparatus as claimed in claim 6, wherein the cooling device (5, 6, 7) most unsusceptible to disturbances is connected to the chamber (10, 11, 12) with the lowest filling volume.

* * * * *